United States Patent
Low et al.

(10) Patent No.: US 12,425,138 B2
(45) Date of Patent: Sep. 23, 2025

(54) METHODS AND DEVICES FOR MANAGING SCHEDULING SERVICE, AND STORAGE MEDIUM

(71) Applicant: GREATER SHINE LIMITED, New Taipei (TW)

(72) Inventors: Su-Lin Low, San Diego, CA (US); Chun-I Lee, San Diego, CA (US); Tianan Tim Ma, San Diego, CA (US); Hong Kui Yang, San Diego, CA (US); Hausting Hong, San Diego, CA (US)

(73) Assignee: GREATER SHINE LIMITED, New Taipei (TW)

( * ) Notice: Subject to any disclaimer, the term of this patent is extended or adjusted under 35 U.S.C. 154(b) by 482 days.

(21) Appl. No.: 18/046,799

(22) Filed: Oct. 14, 2022

(65) Prior Publication Data
US 2023/0069610 A1    Mar. 2, 2023

Related U.S. Application Data

(63) Continuation of application No. PCT/US2021/014937, filed on Jan. 25, 2021.
(Continued)

(51) Int. Cl.
*H04L 1/18*    (2023.01)
*H04L 1/1829*  (2023.01)
(Continued)

(52) U.S. Cl.
CPC ........... *H04L 1/1854* (2013.01); *H04W 72/21* (2023.01)

(58) Field of Classification Search
CPC ... H04L 1/1854; H04L 5/0007; H04L 5/0044; H04W 72/21; H04W 72/1268; H04W 72/566; H04W 72/23; H04W 72/569
See application file for complete search history.

(56) References Cited

U.S. PATENT DOCUMENTS 8,897,237 B2 * 11/2014 Cui ...................... H04W 72/566
                                                    370/313
9,131,525 B2 *  9/2015 Kazmi .................. H04W 72/23
(Continued)

FOREIGN PATENT DOCUMENTS

CN    102123512 A    7/2011
EP       2343945 A2 *  7/2017 ............ H04W 72/12
(Continued)

OTHER PUBLICATIONS

Supplementary European Search Report in the European application No. 21722355.1, mailed on Jul. 4, 2023. 9 pages.
(Continued)

*Primary Examiner* — Abdullahi E Salad
(74) *Attorney, Agent, or Firm* — PERKINS COIE LLP (57) ABSTRACT

Methods for managing a scheduling service includes (i) determining a score for each of multiple service grants from multiple cells based on a scoring function, wherein the scoring function includes one or more radio channel conditions associated with the multiple service grants; (ii) prioritizing the multiple service grants based on the determined scores; and (iii) assigning scheduling opportunities to the multiple service grants based on the determined scores of the multiple grant services from the multiple cells in a geometric decreasing manner. In the geometric decreasing manner, packets of a low priority service grant of the multiple service grants are transmitted once every two packets of a high priority service grant of the multiple service grants.

18 Claims, 8 Drawing Sheets

Related U.S. Application Data (60) Provisional application No. 63/009,825, filed on Apr. 14, 2020.

(51) Int. Cl.
*H04W 72/04* (2023.01)
*H04W 72/21* (2023.01)

(56) References Cited

U.S. PATENT DOCUMENTS

| | | | | |
|---|---|---|---|---|
| 10,334,598 | B2* | 6/2019 | Loehr | H04W 72/0446 |
| 2011/0090806 | A1 | 4/2011 | Ozturk | |
| 2012/0275391 | A1* | 11/2012 | Cui | H04W 72/566 |
| | | | | 370/329 |
| 2012/0275403 | A1 | 11/2012 | Zhang | |
| 2017/0070965 | A1* | 3/2017 | Marinier | H04W 72/1268 |
| 2017/0188391 | A1 | 6/2017 | Rajagopal et al. | |
| 2018/0310308 | A1* | 10/2018 | Loehr | H04W 72/1273 |
| 2019/0274143 | A1 | 9/2019 | Loehr | |
| 2020/0314928 | A1* | 10/2020 | Kang | H04W 76/14 |
| 2020/0367246 | A1* | 11/2020 | Loehr | H04W 72/0446 |
| 2022/0346098 | A1 | 10/2022 | Loehr | |

FOREIGN PATENT DOCUMENTS

| | | |
|---|---|---|
| EP | 3764721 A1 | 1/2021 |
| WO | 2018075828 A1 | 4/2018 |
| WO | 2019185014 A1 | 10/2019 |

OTHER PUBLICATIONS

Andreozzi et al., "Effective scheduling of real-time traffic in HSUPA". 2010 European Wireless Conference (EW). doi:10.1109/ew.2010.5483474.

International Search Report in the international application No. PCT/US2021/014937, mailed on Apr. 13, 2021.

Written Opinion of the International Search Authority in the international application No. PCT/US2021/014937, mailed on Apr. 13, 2021.

First Office Action of the European application No. 21722355.1, issued on Jun. 18, 2024. 9 pages.

First Office Action of the Chinese application No. 202180028725.X, issued on Feb. 27, 2025. 17 pages with English translation.

Second Office Action of the European application No. 21722355.1, issued on Mar. 11, 2025. 9 pages.

* cited by examiner

METHODS AND DEVICES FOR MANAGING SCHEDULING SERVICE, AND STORAGE MEDIUM

CROSS-REFERENCE TO RELATED APPLICATION(S)

This application is a continuation of International Patent Application No. PCT/US2021/014937 filed on Jan. 25, 2021, which claims the benefit of U.S. Provisional Patent Application Ser. No. 63/009,825, filed on Apr. 14, 2020. The entire contents of the prior applications are incorporated by reference herein in their entirety.

BACKGROUND

Rapid growth in computing technology is creating a greater demand for data communication. The increasing demand in turn drives further growth in communication technology, which often requires additional features, increased processing capacities, and/or increased resources within a given space. Such growth often introduces new challenges. Traditionally, when multiple service grants are received in a slot from multiple cells, each service grant is serviced one by one as it arrives in the slot. Challenges in a 5G (the fifth generation technology standard for broadband cellular networks) system include that the system may have to provide service to multiple grants from multiple cells in a multiple carrier aggregation configuration. For example, the system may be connected to two or more Medium Access Control (MAC) entities, and each of the MAC entities is connected to a base station (NodeB) with multiple carriers of different bandwidth, resources, and radio channel conditions. The traditional approach of servicing multiple logical channel data packets can be inefficient and time-consuming.

SUMMARY

The present disclosure relates to the communications field, in particular to a wireless communication method and device, and more specifically, to methods and devices for 5G MAC uplink multiple carrier grant scheduling.

In a first aspect, there is provided a method for managing a scheduling service. The method includes the following operations.

A score for each of multiple service grants based on a scoring function is determined. Herein, the scoring function includes one or more radio channel conditions associated with the multiple service grants.

The multiple service grants are prioritized based on the determined scores.

Scheduling opportunities are assigned to the multiple service grants based on the determined scores of the multiple service grants in a geometric decreasing manner.

Herein, in the geometric decreasing manner, packets of a low priority service grant of the multiple service grants are transmitted once every two packets of a high priority service grant of the multiple service grants.

In a second aspect, there is provided a method for managing a scheduling service. The method includes the following operations.

A score for each of multiple service grants from multiple cells is determined based on a scoring function, herein, the scoring function includes one or more radio channel conditions associated with the multiple service grants.

A low priority service grant and a high priority service grant of the multiple service grants are determined based on the determined scores.

Packets of a low priority service grant are transmitted once every two packets of the high priority service grant.

In a third aspect, there is provided a non-transitory computer-readable storage medium. The non-transitory computer-readable storage medium has instructions stored thereon that, when executed by one or more processors, cause the one or more processors to implement the instructions so as to perform a method including the following operations.

A score for each of multiple service grants from multiple cells is determined based on a scoring function, herein, the scoring function includes one or more radio channel conditions associated with the multiple service grants.

The multiple service grants are prioritized based on the determined scores.

Scheduling opportunities are assigned to the multiple service grants based on the determined scores of the multiple services grants in a geometric decreasing manner.

Herein, in the geometric decreasing manner, packets of a low priority service grant of the multiple service grants are transmitted intermittently between packets of a high priority service grant of the multiple service grants.

BRIEF DESCRIPTION OF THE DRAWINGS

To describe the technical solutions in the implementations of the present disclosure more clearly, the following briefly describes the accompanying drawings. The accompanying drawings show merely some aspects or implementations of the present disclosure, and a person of ordinary skill in the art may still derive other drawings from these accompanying drawings without creative efforts.

DETAILED DESCRIPTION

The following describes the technical solutions in the one or more implementations of the present disclosure. The present disclosure provides methods and systems for managing multiple service grants from multiple cells. The multiple service grants are evaluated, rated, graded, scored, and/or prioritized based on a scoring function, which considers multiple radio channel conditions associated with the multiple grants. Embodiments of the scoring function are discussed in detail with reference to Equations (A), (B), and (C) below.

Once the multiple service grants are scored or prioritized, different scheduling opportunities are assigned thereto based on their scores or priorities. The present disclosure provides a scheduling algorithm to assign the scheduling opportunities. For example, packets of a low priority service grant can be transmitted intermittently between packets of a high priority service grant of the multiple service grants. In some embodiments, the packets of the low priority service grant can be transmitted once every two (or other numbers) packets of the high priority service grant of the multiple service grants. Embodiments of the scheduling algorithm are discussed in detail with reference to FIG. 4.

Communications Environment

Figure 1:
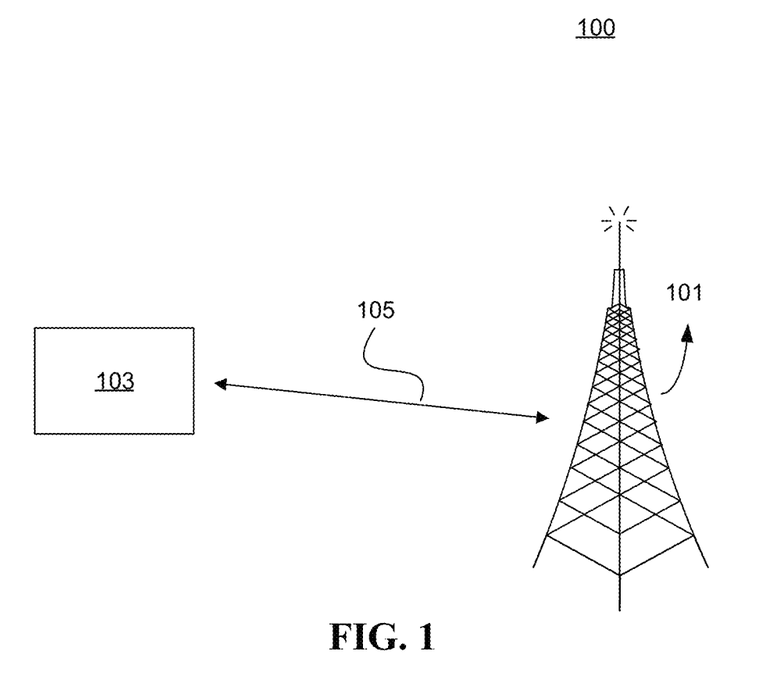
FIG. 1 is a schematic diagram of a wireless communication system in accordance with one or more implementations of the present disclosure.

FIG. 1 is a schematic diagram of a wireless communication system 100 in accordance with one or more implementations of the present disclosure. The present method can be implemented to facilitate service grants scheduling of the wireless communication system 100. As shown in FIG. 1, the wireless communications system 100 can include a network device 101. Examples of the network device 101 include a base transceiver station (Base Transceiver Station, BTS), a NodeB (NodeB, NB), an evolved Node B (eNB or eNodeB), a Next Generation NodeB (gNB or gNode B), a Wireless Fidelity (Wi-Fi) access point (AP), etc. In some embodiments, the network device 101 can include a relay station, an access point, an in-vehicle device, a wearable device, and the like. The network device 101 can include wireless connection devices for communication networks such as: a Global System for Mobile Communications (GSM) network, a Code Division Multiple Access (CDMA) network, a Wideband CDMA (WCDMA) network, an LTE network, a cloud radio access network (Cloud Radio Access Network, CRAN), an Institute of Electrical and Electronics Engineers (IEEE) 802.11-based network (e.g., a Wi-Fi network), an Internet of Things (IoT) network, a device-to-device (D2D) network, a next-generation network (e.g., a 5G network), a future evolved public land mobile network (Public Land Mobile Network, PLMN), or the like. A 5G system or network may be referred to as a new radio (New Radio, NR) system or network.

As shown in FIG. 1, the wireless communications system 100 also includes a terminal device 103. The terminal device 103 can be an end-user device configured to facilitate wireless communication. The terminal device 103 can be configured to wirelessly connect to the network device 101 (via, e.g., a wireless channel 105) according to one or more corresponding communication protocols/standards. The terminal device 103 may be mobile or fixed. The terminal device 103 can be a user equipment (UE), an access terminal, a user unit, a user station, a mobile site, a mobile station, a remote station, a remote terminal, a mobile device, a user terminal, a terminal, a wireless communications device, a user agent, or a user apparatus. Examples of the terminal device 103 include a modem, a cellular phone, a smart phone, a cordless phone, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, an IoT device, a terminal device in a future 5G network, a terminal device in a future evolved PLMN, or the like.

For illustrative purposes, FIG. 1 illustrates only one network device 101 and one terminal device 103 in the wireless communications system 100. However, it is understood that, in some instances, the wireless communications system 100 can include additional/other devices, such as additional instances of the network device 101 and/or the terminal device 103, a network controller, a mobility management entity/devices, etc.

Service Grant Scheduling

According to IEEE 802 LAN/MAN standards, MAC layer controls the hardware that is responsible for interaction with a wireless transmission medium. The MAC layer provides flow control and multiplexing for the wireless transmission medium. In an uplink (UL) process, UL MAC layer of a user equipment (UE) receives an UL grant resource allocation from a physical downlink common control channel (PDCCH) at the beginning of a slot (e.g., in a downlink control indicator, DCI). The UL grant resource allocation informs the UE to transmit an UL MAC protocol data unit (PDU) at a time delay equivalent to "K2" slots away from the current slot. "K2" can be named as a latency indicator, which indicates a slot offset between an UL grant and corresponding UL transmission.

Figure 2A:
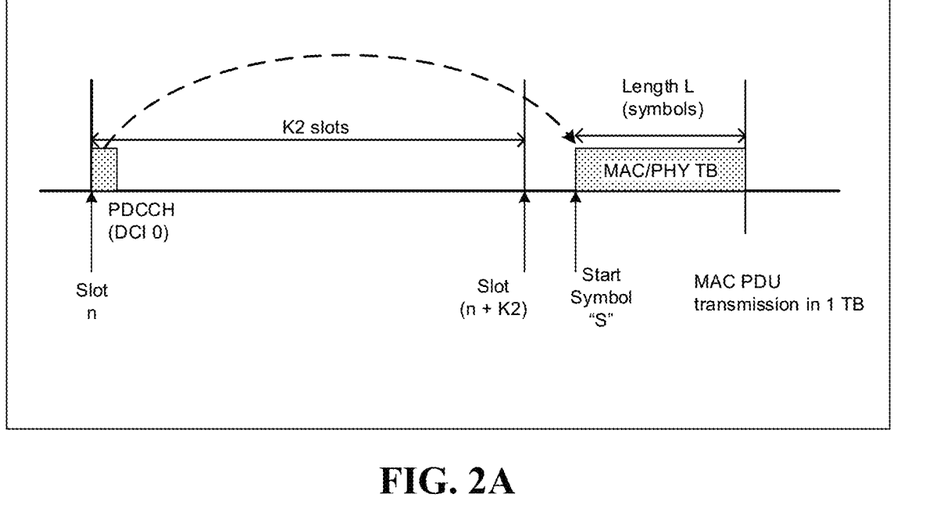
FIGS. 2A and 2B are schematic diagrams illustrating a latency indicator K2 in accordance with one or more implementations of the present disclosure.

The latency indicator K2 can have different values to indicate different latency requirements. For example, when K2 equals to "1," it indicates that a transmission start symbol S (i.e., the slot boundary of the MAC PDU) is "K2" slot away from the PDCCH. FIG. 2A illustrates embodiments where the latency indicator K2 is greater than or equals to "1." As indicated in FIG. 2A, a transmission start symbol S is at least "K2" slot away from the PDCCH (at slot "n"). As also shown, the MAC PDU can be transmitted in a transport block (TB), with a length of "L" symbols. In other words, the PDCCH and the MAC PDU are not transmitted in the same slot.

Figure 2B:
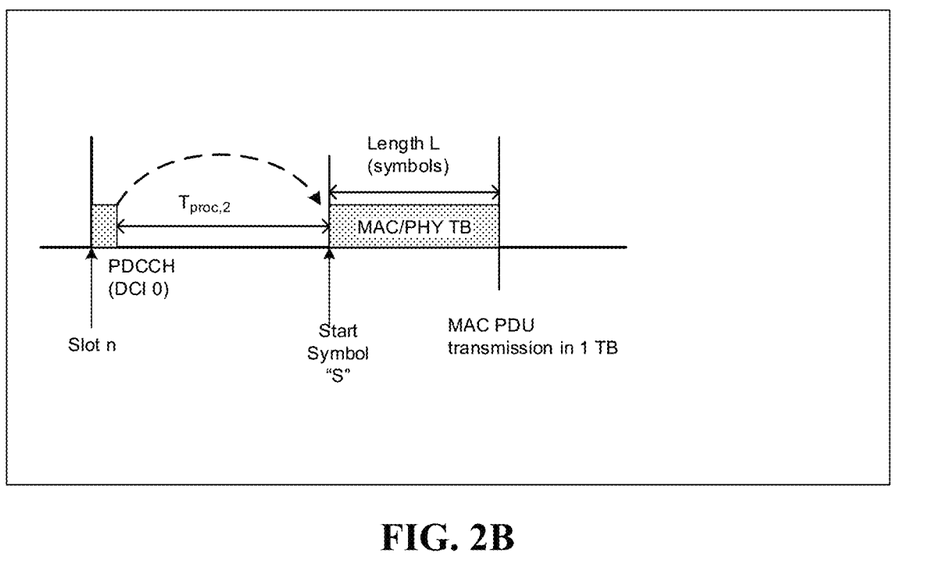

FIG. 2B illustrates embodiments where the latency indicator K2 is less than "1." When the latency indicator K2 is less than "1," (e.g., K2="0"), it indicates that the grants are to be serviced for data with a low latency requirement (e.g., to be handled as soon as possible). In other words, as shown in FIG. 2B, the PDCCH and the transmission start symbol S (i.e., the slot boundary of the MAC PDU) are in the same slot. In such cases, data in logical channels (LCs) can be pulled into the grants. "$T_{proc,2}$" is a processing time for the grants, which can be calculated based on Equation (1) below.

$$T_{proc,2} = \max((N_2 + d_{2,1})(2048+144) \cdot K2^{-\mu} \cdot T_c, d_{2,2})  \quad \text{Equation (1)}$$

In Equation (1), "$N_2$" is physical uplink shared channel (PUSCH) preparation time. Parameters "$d_{2,1}$" and "$d_{2,2}$" are demodulation reference signal (DMRS) parameters. "Tc" is a time reference parameter. Parameter "$\mu$" corresponds to "$N_2$" and indicates carrier spacing.

In some embodiment, a Logical Channel Prioritization (LCP) method can be used to schedule packets from LCs according to allocated grant bytes from a configured maximum bucket size setting. In a UE configuration with Carrier Aggregation (CA), there are multiple component carriers (CCs) aggregated for transmission. Therefore, the UE may receive multiple grants concurrently, e.g., one from each CC and each cell. As discussed herein (e.g., FIGS. 3-8), the present disclosure provides an UE UL MAC scheduling algorithm or a method that can service these multiple grants that arrive concurrently.

Figure 3:
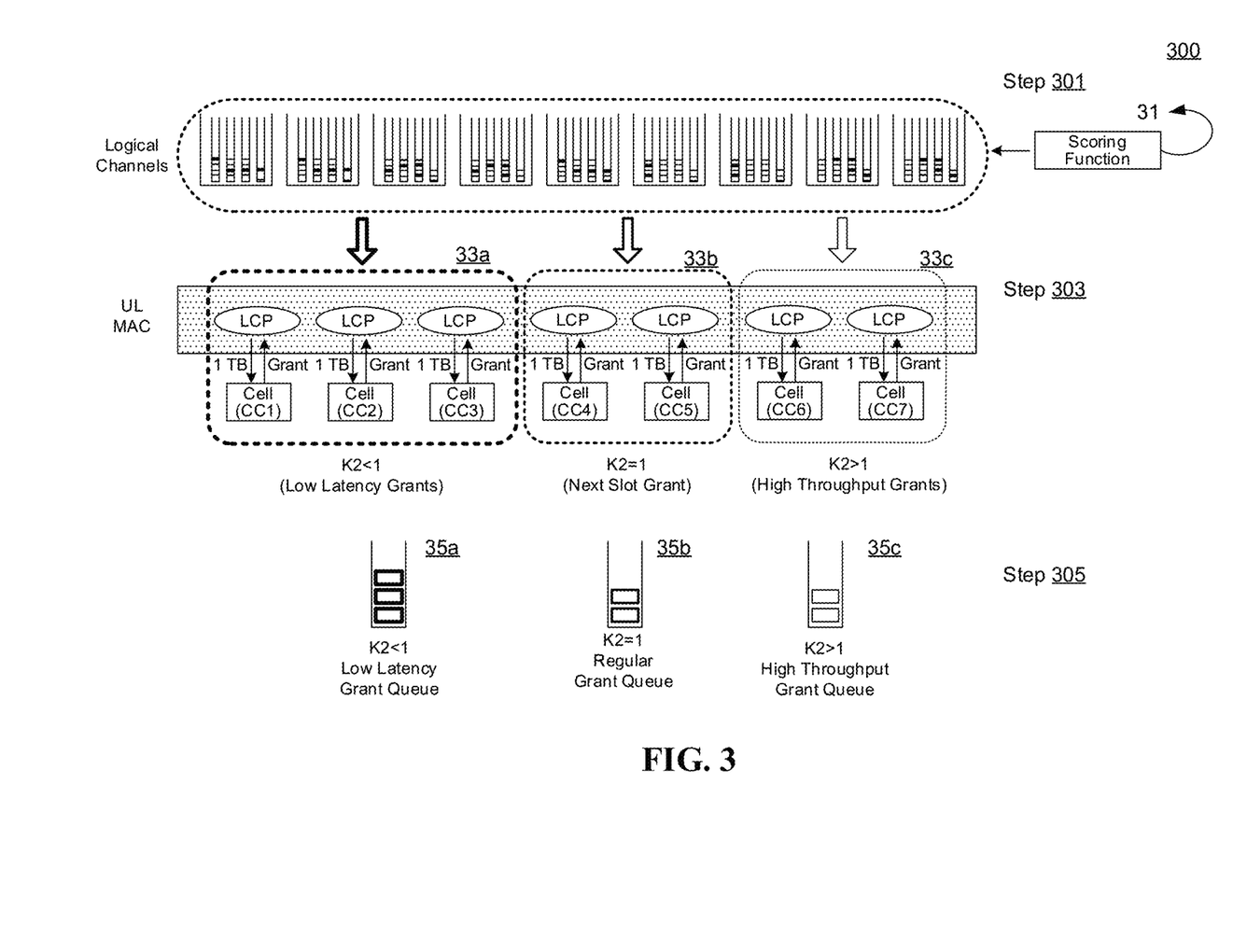
FIG. 3 is a schematic diagram illustrating a service grant scheduling process in accordance with one or more implementations of the present disclosure.

FIG. 3 is a schematic diagram illustrating a service grant scheduling process 300 in accordance with one or more implementations of the present disclosure. In Step 301, multiple service grants arrive dynamically from various LCs are evaluated, rated, graded, scored, and/or prioritized based on a scoring function 31.

The scoring function 31 includes one or more radio channel conditions associated with the multiple service grants, and is configured to assess a "grant worthiness" of each of the multiple service grants. Examples of the radio channel conditions include a latency indicator (e.g., a slot offset value, K2), a start symbol (S) of a slot transmit boundary, a Physical Uplink Shared Channel (PUSCH) slot transmission time duration (T), a received power (P), a SubCarrier Spacing (SCS) (C), a grant size (G), an interference level (I), or a spectral efficiency (M). In some embodiments, the scoring function can be represented by Equation (A) as follows.

$$\text{Grant\_Score} = \text{Function}(K2, S, T, P, C, G, I, M) \quad \text{Equation (A)}$$

It is noted that, in different embodiments, the scoring function 31 can be in various forms. In some embodiments, each of the radio channel conditions can have a parameter or a weighting factor (f) such that a system administrator can adjust the weighting of each radio channel condition in various types of operations. In such embodiments, the scoring function can be represented by Equations (B) and (C) as follows.

$$\text{Grant\_Score} = [(f4)(P) + (f5)(C) - (f2)(S) - (f6)(G) - (f7)(I) - (f8)(M)] / [(f1)(K2) + (f3)(T)] \quad \text{Equation (B)}$$

$$\text{Grant\_Score} = [(f4)(P) + (f5)(C) - (f6)(G) - (f7)(I) - (f8)(M)] / [(f1)(K2) + (f2)(S) + (f3)(T)] \quad \text{Equation (C)}$$

Equation (B) applies to cases where the latency indicator K2 is greater and equal to "1" (i.e., relatively high latency requirement). Equation (C) applies to cases where the latency indicator K2 is less than "1" (i.e., relatively low latency requirement). It is noted that, in Equations (B) and (C), the start symbol (S) conditions are arranged differently. By this configuration, the scoring function can consider the relative importance of the start symbol (S) condition for each grant and reflect it in its score (e.g., "Grant_Score" in Equations (A), (B), and (C)) determined by the scoring function.

The following descriptions further discuss the radio channel conditions in the scoring function and their implications. As discussed in FIGS. 2A and 2B, the latency indicator K2 indicates a latency time to the slot transmit boundary (i.e., start symbol S) of a service grant. When the latency indicator K2 is "0," it indicates that the grant requires an immediate attention. In these cases, the start symbol S has direct or strong influence on the score (see Equation C) because it reflects the level of urgency of that grant (e.g., how close to the PDCCH shown in FIGS. 2A and 2B). Accordingly, when the latency indicator K2 is greater than or equal to "1," the start symbol S has less influence on the score (Equation B).

The PUSCH slot transmission time duration T of a service grant is proportional to the allowed processing time of its UL MAC multiplexing function. A small time duration is typically given for low latency grants, such that the UL MAC can quickly turn around and service the packets. Therefore, a small "T" can reflect a higher score so as to allow the grant to be serviced with a higher priority.

In some embodiments, weighting factors f1, f2, and f3 "scale up" the influences of "K2," "5," and "T," compared to the rest of the weighting factors f4-f8. On the cell carrier side, the cell's received power P indicates a radio link strength of this channel. Factor f4 for the received power P can also be considered as a relatively strong factor compared to factors f5-f8.

In some embodiments, the SubCarrier Spacing C of a grant indicates (indirectly) the available bandwidth and slot resolution for the corresponding cell. A high value (e.g., 120 kHz) can indicate that slots of "0.125 ms" are available for low latency applications, and thus it can contribute to a higher score.

The grant size G of a grant decreases the score, since a large size grant would take up a large amount of processing time to dequeue corresponding processes. As a result, factor f6 can be considered as a "penalty" factor which decreases the score.

The interference level I of a cell also decreases the score. It is because a high interference level indicates a sub-optimal radio channel condition for this transmission channel. Accordingly, factor f7 can also be considered a "penalty" factor which decreases the score.

The spectral efficiency M is the product of the "Modulation Order" and "Target Code Rate" of a grant transmission's assigned Modulation and Coding Scheme (MCS) Table. Factor f8 for the spectral efficiency M can also be a "penalty" factor since a high throughput application (which has a high spectral efficiency, such that more larger packet sizes can be transferred in a slot grant) would consume a large amount of processing time and resources.

Once the multiple service grants are scored, they can be prioritized and stored for further processes. In Step 303, the multiple service grants can be divided into three buckets 33a-c based on their latency indicators K2. The bucket 33a is for the grants with their latency indicators "K2<1." The bucket 33b is for the grants with their latency indicators "K2=1." The bucket 33c is for the grants with their latency indicators "K2>1." Generally speaking, the grants in the bucket 33a are handled prior to those in the bucket 33b and 33c. The grants in the bucket 33b are handled prior to those in the bucket 33c.

In some embodiments, the grants in the same bucket can be put in a queue. As shown in Step 305 in the illustrated embodiment, there can be a "K2<1" or "low latency" queue 35a for the bucket 33a, a "K2=1" or "regular" queue for the bucket 33b, and a "K2>1" or "high throughput" queue for the bucket 33c. The "K2<1" queue is serviced first, followed by the "K2=1" queue, and lastly the "K2>1" queue.

In each queue, the service grant with the highest score is serviced first (which gives it the highest scheduling opportunity for its packets to be dequeued from associated LCs. The next highest scored grant is then serviced, and so forth. The opportunity to dequeue the packets from the LCs thus decreases as the process moves forward.

In some embodiments, one or more of the queues can be further processed based on a scheduling algorithm for further enhance the overall transmission efficiency. For example, the "K2<1" or "low latency" queue 35a can be serviced first based on a "geometric decreasing" scheduling algorithm described in FIG. 4.

Figure 4:
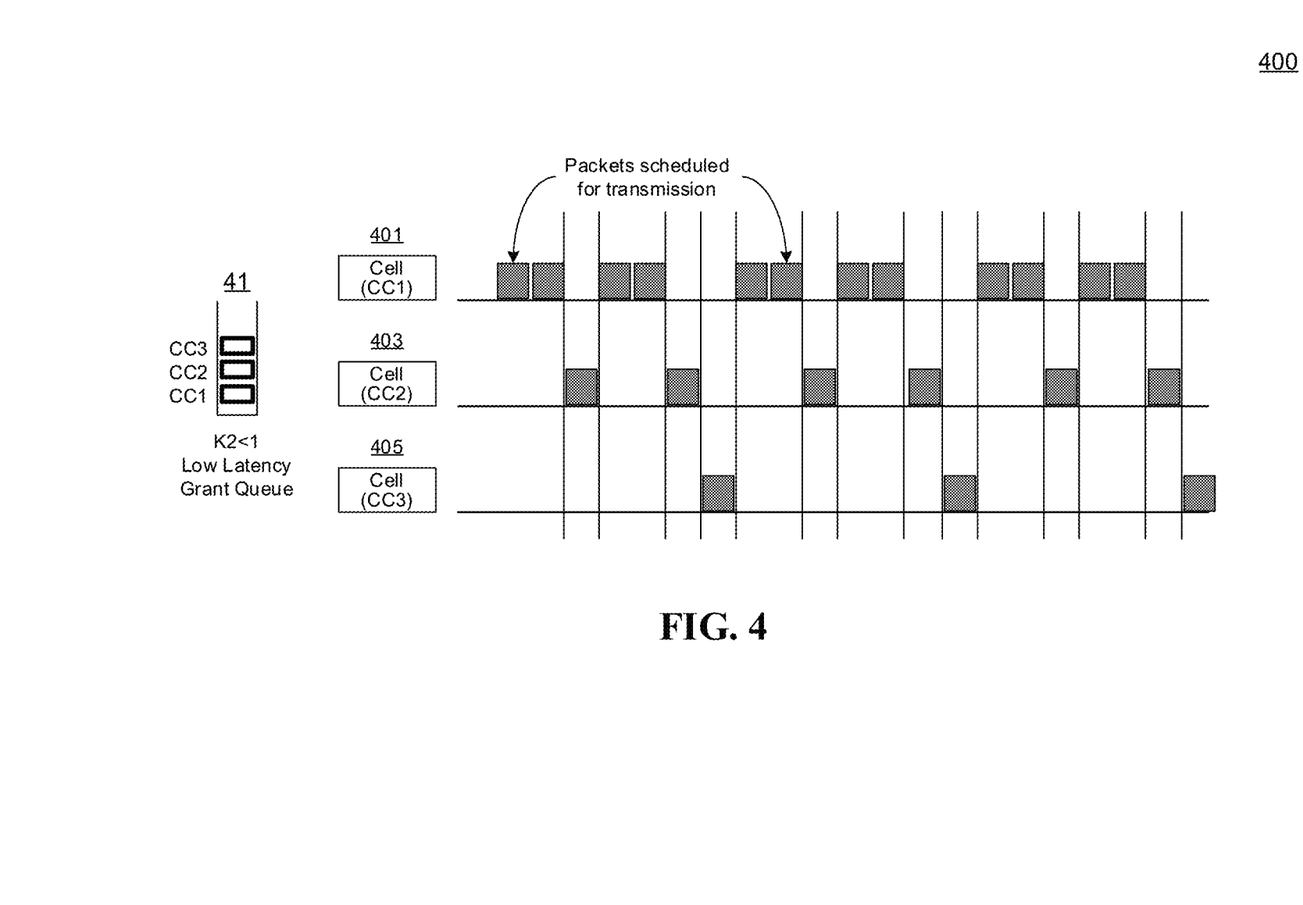
FIG. 4 is a schematic diagram illustrating a scheduling algorithm in accordance with one or more implementations of the present disclosure.

As shown in FIG. 4, a low latency queue 41 includes service grants from three cells or component carriers CC1, CC2, and CC3. According to the scores for each service grant determined based on the scoring function, CC1 has the highest score, followed by CC2, and CC3 has the lowest score. Although the service grants associated with CC1 is still to be processed first, followed by those associated with CC2, and then those with CC3, this can be done in a geometric decreasing manner. More particularly, the packets from the CC1-3 can be intermittently serviced. As shown in FIG. 4, for example, two packets from CC1 are serviced first. The one packet from CC2 can be serviced. After repeating the foregoing process twice, one packet from CC3 can be serviced. In other words, one of the packets of CC2 is serviced or transmitted after two packets of CC1 have been serviced. Similarly, one of the packets of CC3 is serviced or transmitted after two packets of CC2 have been serviced.

Figure 5:
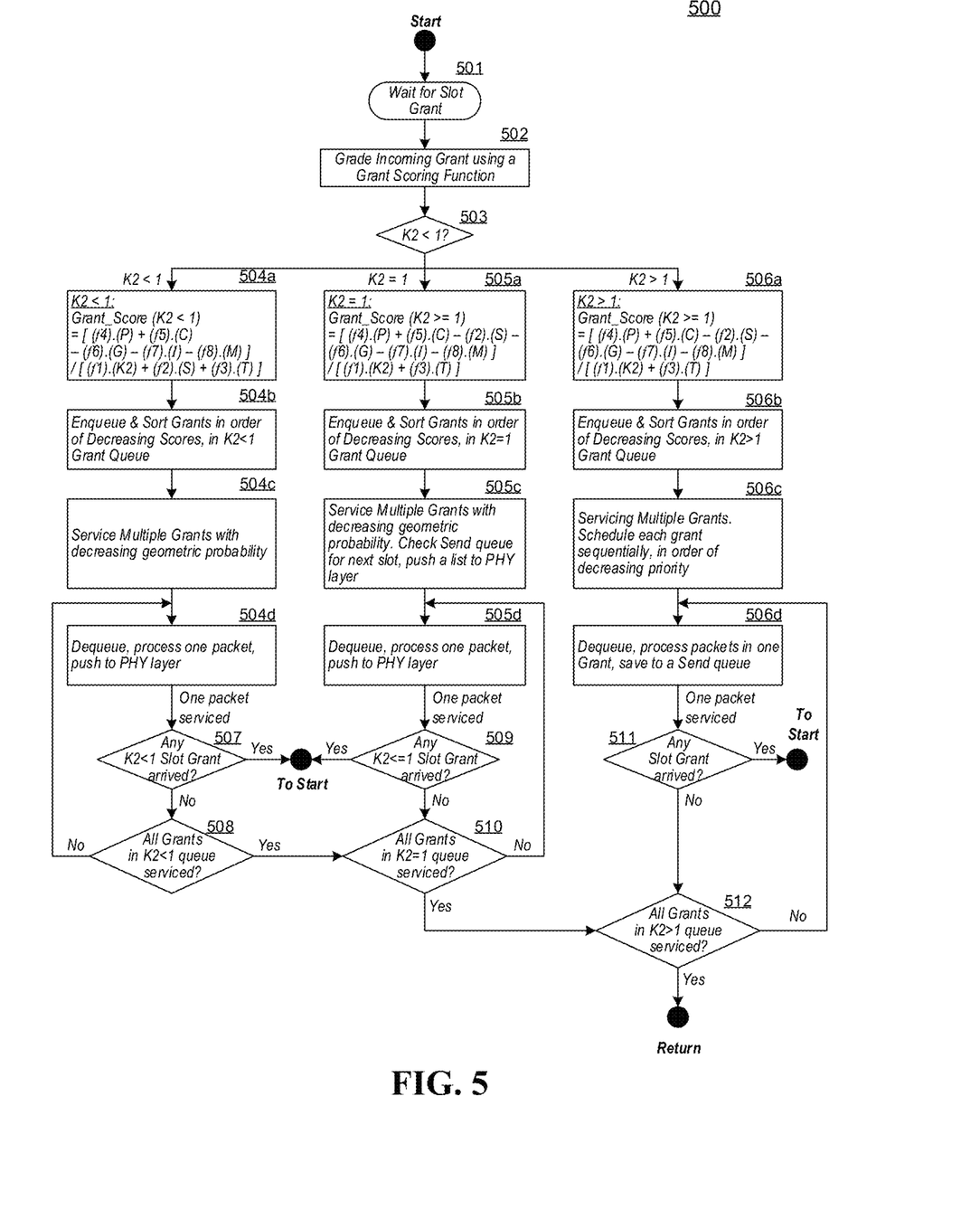
FIG. 5 is a flowchart illustrating a service grant scheduling process in accordance with one or more implementations of the present disclosure.

FIG. 5 is a flowchart illustrating a service grant scheduling process 500 in accordance with one or more implementations of the present disclosure. At block 501, multiple slot grants arrive for scheduling. At block 502, the process 500 prepares two or more scoring functions to be used generate a score for each of the multiple grants. At decision block 503, the process 500 first puts the multiple grants in three queues, "K2<1," "K2=1," and "K2>1" queues, according to the latency indicator "K2" of the multiple grants.

In process flow 504 for the "K2<1" queue (indicated as 504a-d in FIG. 5), a first scoring function (e.g., see Equation C above) is used. At block 504a, the first scoring function is used to calculate scores for each grants in the "K2<1" queue. At block 504b, the grants are enqueued and sorted in an order of decreasing scores. At block 504c, the multiple grants in the "K2<1" queue are serviced with a geometric decreasing probability (see e.g., FIG. 4). At block 504d, one grant in the "K2<1" queue is dequeued and one packet is pushed to a physical (PHY) layer.

At decision block 507, the process 500 determines if there is any additional "K2<1" grant arrives. If affirmative, the process 500 goes back to Start. If negative, the process 500 goes to decision block 508 to determine if all grants in the "K2<1" queue are serviced. If negative, the process 500 goes back to block 504d. If affirmative, the process 500 goes to block 510.

In process flow 505 for the "K2=1" queue (indicated as 505a-d in FIG. 5), a second scoring function (e.g., see Equation B above) is used. At block 505a, the second scoring function is used to calculate scores for each grants in the "K2=1" queue. At block 505b, the grants are enqueued and sorted in an order of decreasing scores. At block 505c, the multiple grants in the "K2=1" queue are serviced with a geometric decreasing probability (see e.g., FIG. 4). In the same block, the process 500 can check a "Send" queue for the next slot (see also block 506d), and push the "Send queue" to the PHY layer. At block 505d, one grant in the "K2=1" queue is dequeued and one packet is pushed to the PHY layer.

At decision block 509, the process 500 determines if there is any additional "K2=1" grant arrives. If affirmative, the process 500 goes back to Start. If negative, the process 500 goes to decision block 510 to determine if all grants in the "K2=1" queue are serviced. If negative, the process 500 goes back to block 505d. If affirmative, the process 500 goes to block 512.

In process flow 506 for the "K2>1" queue (indicated as 506a-d in FIG. 5), the second scoring function (e.g., see Equation B above) is selected and used to calculate scores for each grants in the "K2>1" queue, at block 506a. At block 506b, the grants are enqueued and sorted in an order of decreasing scores. At block 506c, the multiple grants in the "K2>1" queue are serviced with a decreasing probability. At block 506d, one grant in the "K2>1" queue is dequeued and one packet is saved to the Send queue (see block 505c).

At decision block 511, the process 500 determines if there is any additional "K2>1" grant arrives. If affirmative, the process 500 goes back to Start. If negative, the process 500 goes to decision block 512 to determine if all grants in the "K2>1" queue are serviced. If negative, the process 500 goes back to block 506d. If affirmative, the process 500 stops or returns for further processes.

Figure 6:
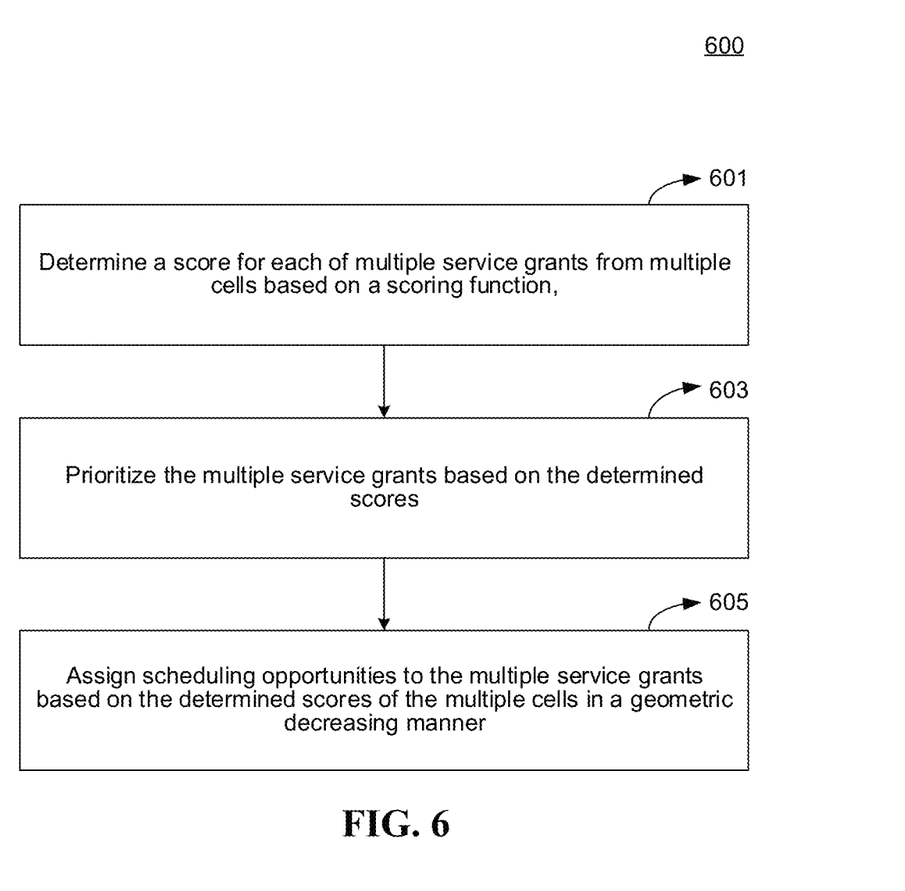
FIG. 6 is a flowchart of an example method in accordance with one or more implementations of the present disclosure.

FIG. 6 is a flowchart of a method 600 in accordance with one or more implementations of the present disclosure. At block 601, the method 600 includes determining a score for each of multiple service grants from multiple cells based on a scoring function. In some embodiments, the scoring function includes (e.g., Equations (A), (B) and (C) discussed above) one or more radio channel conditions associated with the multiple service grants.

At block 603, the method 600 includes prioritizing the multiple service grants based on the determined scores. At block 605, the method 600 includes assigning scheduling opportunities to the multiple service grants based on the determined scores of the multiple cells in a geometric decreasing manner. For example, the packets of a low priority service grant of the multiple service grants can be transmitted once every two packets of a high priority service grant of the multiple service grants.

In some embodiments, the scheduling opportunities can be assigned to the multiple service grants based the determined scores in a score-decreasing manner (e.g., grants with higher scores are handled first).

Figure 7:
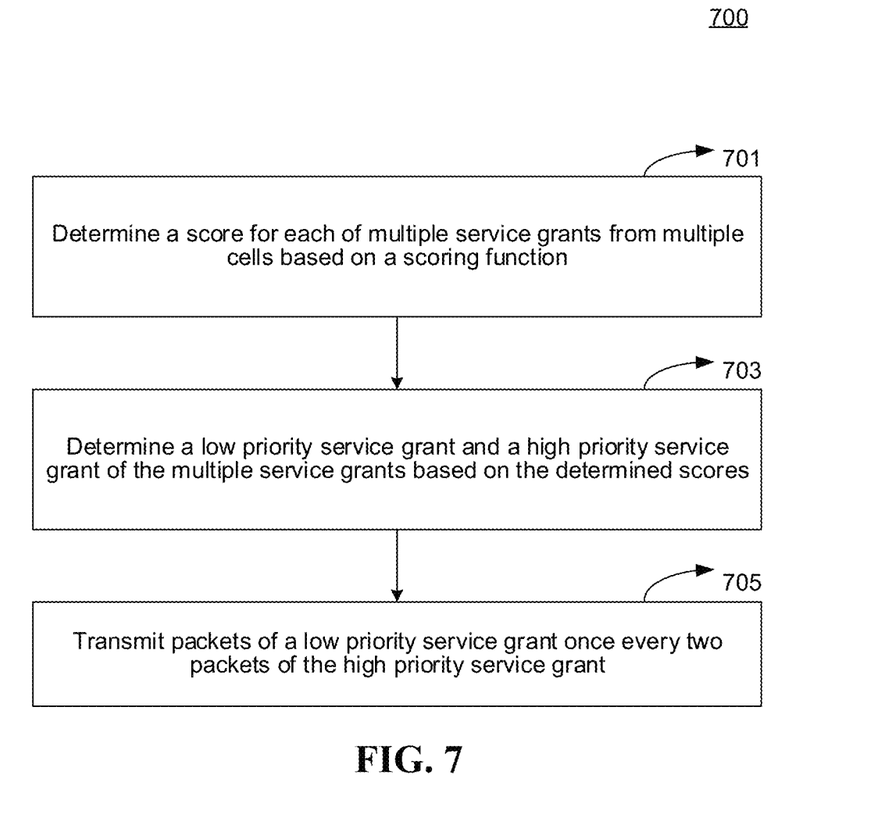
FIG. 7 is a flowchart of an example method in accordance with one or more implementations of the present disclosure.

FIG. 7 is a flowchart of a method 700 in accordance with one or more implementations of the present disclosure. At block 701, the method 700 includes determining a score for each of multiple service grants from multiple cells based on a scoring function. In some embodiments, the scoring function includes (e.g., Equations (A), (B) and (C) discussed above) one or more radio channel conditions associated with the multiple service grants.

At block 703, the method 700 includes determining a low priority service grant and a high priority service grant of the multiple service grants based on the determined scores. At block 705, the method 700 includes transmitting packets of a low priority service grant once every two packets of the high priority service grant. For example, the packets of the low priority service grant of the multiple service grants can be transmitted once every two packets of the high priority service grant of the multiple service grants.

Additional Embodiments

Some embodiments of the present disclosure provide methods for managing a scheduling service in a wireless communications system. A scoring function is provided to determine a score for each of multiple service grants from multiple cells. Based on the determined scores of the multiple service grants, these service grants can be prioritized and assigned different scheduling opportunities in a "geometric decreasing" manner. For example, packets of a low priority service grant can be transmitted intermittently between packets of a high priority service grant of the multiple service grants. In some embodiments, the packets of the low priority service grant can be transmitted once every two (or other numbers) packets of the high priority service grant of the multiple service grants (see FIG. 4).

The scoring function considers one or more radio channel conditions of the multiple service grants. The radio channel conditions can include a latency indicator (e.g., a slot offset value, K2), a start symbol (S) of a slot transmit boundary, a Physical Uplink Shared Channel (PUSCH) slot transmission time duration (T), a received power (P), a SubCarrier Spacing (SCS), a grant size (G), an interference level (I), or a spectral efficiency (M). In some embodiments, each of the radio channel conditions can have a parameter or a weighting factor (f) such that a system administrator can adjust the weighting of each radio channel condition in various types of operations.

Some embodiments of the present disclosure provide a method for scheduling uplink MAC service grants. The method includes, for example, (i) determining a score for each of multiple service grants from multiple cells based on a scoring function; (ii) prioritizing the multiple service grants based on the determined scores; and (iii) assigning scheduling opportunities to the multiple service grants based on the determined scores of the multiple cells in a geometric decreasing manner.

Some embodiments of the present disclosure provide a method for managing a scheduling service. The method includes (a) determining a score for each of multiple service grants from multiple cells based on a scoring function; (b) determining a low priority service grant and a high priority service grant of the multiple service grants based on the determined scores; and (c) transmitting packets of a low priority service grant once every two packets of the high priority service grant.

In some embodiment, the present method can be implemented by a tangible, non-transitory, computer-readable medium having processor instructions stored thereon that, when executed by one or more processors, cause the one or more processors to perform one or more aspects/features of any method described in the embodiments of the present disclosure.

Example Devices and Systems

Figure 8:
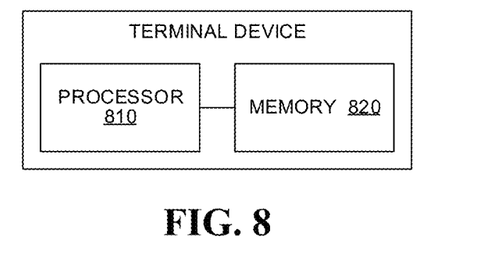
FIG. 8 is a schematic block diagram of a terminal device in accordance with one or more implementations of the present disclosure.

FIG. 8 is a schematic block diagram of a terminal device 800 (e.g., an example of the terminal device 103 of FIG. 1) in accordance with one or more implementations of the present disclosure. As shown in FIG. 8, the terminal device 800 includes a processing unit 810 (e.g., a DSP, a CPU, a GPU, etc.) and a memory 820. The processing unit 810 can be configured to implement instructions that correspond to the present methods and/or other aspects of the implementations described above.

It should be understood that the processor in the implementations of this technology may be an integrated circuit chip and has a signal processing capability. During implementation, the steps in the foregoing method may be implemented by using an integrated logic circuit of hardware in the processor or an instruction in the form of software. The processor may be a general-purpose processor, a digital signal processor (DSP), an application specific integrated circuit (ASIC), a field programmable gate array (FPGA) or another programmable logic device, a discrete gate or transistor logic device, and a discrete hardware component. The methods, steps, and logic block diagrams disclosed in the implementations of this technology may be implemented or performed. The general-purpose processor may be a microprocessor, or the processor may be alternatively any conventional processor or the like. The steps in the methods disclosed with reference to the implementations of this technology may be directly performed or completed by a decoding processor implemented as hardware or performed or completed by using a combination of hardware and software modules in a decoding processor. The software module may be located at a random-access memory, a flash memory, a read-only memory, a programmable read-only memory or an electrically erasable programmable memory, a register, or another mature storage medium in this field. The storage medium is located at a memory, and the processor reads information in the memory and completes the steps in the foregoing methods in combination with the hardware thereof.

It may be understood that the memory in the implementations of this technology may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random-access memory (RAM) and is used as an external cache. For exemplary rather than limitative description, many forms of RAMs can be used, and are, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchronous link dynamic random-access memory (SLDRAM), and a direct Rambus random-access memory (DR RAM). It should be noted that the memories in the systems and methods described herein are intended to include, but are not limited to, these memories and memories of any other suitable type.

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the described technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative implementations or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

In the Detailed Description, numerous specific details are set forth to provide a thorough understanding of the presently described technology. In other implementations, the techniques introduced here can be practiced without these specific details. In other instances, well-known features, such as specific functions or routines, are not described in detail in order to avoid unnecessarily obscuring the present disclosure. References in this description to "an implementation/embodiment," "one implementation/embodiment," or the like mean that a particular feature, structure, material, or characteristic being described is included in at least one implementation of the described technology. Thus, the appearances of such phrases in this specification do not necessarily all refer to the same implementation/embodiment. On the other hand, such references are not necessarily mutually exclusive either. Furthermore, the particular features, structures, materials, or characteristics can be combined in any suitable manner in one or more implementations/embodiments. It is to be understood that the various implementations shown in the figures are merely illustrative representations and are not necessarily drawn to scale.

Several details describing structures or processes that are well-known and often associated with communications systems and subsystems, but that can unnecessarily obscure some significant aspects of the disclosed techniques, are not set forth herein for purposes of clarity. Moreover, although the following disclosure sets forth several implementations of different aspects of the present disclosure, several other implementations can have different configurations or different components than those described in this section. Accordingly, the disclosed techniques can have other implementations with additional elements or without several of the elements described below.

Many implementations or aspects of the technology described herein can take the form of computer- or processor-executable instructions, including routines executed by a programmable computer or processor. Those skilled in the relevant art will appreciate that the described techniques can be practiced on computer or processor systems other than those shown and described below. The techniques described herein can be implemented in a special-purpose computer or data processor that is specifically programmed, configured, or constructed to execute one or more of the computer-executable instructions described below. Accordingly, the terms "computer" and "processor" as generally used herein refer to any data processor. Information handled by these computers and processors can be presented at any suitable display medium. Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

The terms "coupled" and "connected," along with their derivatives, can be used herein to describe structural relationships between components. It should be understood that these terms are not intended as synonyms for each other. Rather, in particular implementations, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements cooperate or interact with each other (e.g., as in a cause-and-effect relationship, such as for signal transmission/reception or for function calls), or both. The term "and/or" in this specification is only an association relationship for describing the associated objects, and indicates that three relationships may exist, for example, A and/or B may indicate the following three cases: A exists separately, both A and B exist, and B exists separately.

These and other changes can be made to the disclosed technology in light of the above Detailed Description. While the Detailed Description describes certain examples of the disclosed technology, as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

A person of ordinary skill in the art may be aware that, in combination with the examples described in the implementations disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A method for managing a scheduling service, the method comprising:

determining a score for each of multiple service grants based on a scoring function, wherein the scoring function includes one or more radio channel conditions associated with the multiple service grants; wherein the one or more radio channel conditions of the scoring function includes one or more of:

a latency indicator (K2);

a start symbol(S) of a slot transmit boundary;

a Physical Uplink Shared Channel (PUSCH) slot transmission time duration (T);

a received power (P);

a SubCarrier Spacing (SCS);

a grant size (G);

an interference level (I); or a spectral efficiency (M);

prioritizing the multiple service grants based on the determined scores; and assigning scheduling opportunities to the multiple service grants based on the determined scores of the multiple service grants in a geometric decreasing manner, wherein, in the geometric decreasing manner, packets of a low priority service grant of the multiple service grants are transmitted once every two packets of a high priority service grant of the multiple service grants.

2. The method of claim 1, wherein the scheduling service is an uplink medium access control (MAC) grant scheduling service.

3. The method of claim 1, wherein the scoring function includes the following equation:

$$\text{Grant\_Score} = \text{Function}(K2, S, T, P, C, G, I, M), \text{ wherein,}$$

K2 refers to the latency indicator;
S refers to the start symbol of the slot transmit boundary;
T refers to the PUSCH slot transmission time duration;
P refers to the received power;
C refers to the SCS;
G refers to the grant size;
I refers to the interference level; and
M refers to the spectral efficiency.

4. The method of claim 1, wherein each of the one or more radio channel conditions of the scoring function has a weighting factor (f).

5. The method of claim 4, wherein the scoring function includes the following equation:

$$\text{Grant\_Score} = [(f4)(P) + (f5)(C) - (f2)(S) - (f6)(G) - (f7)(I) - (f8)(M)] / [(f1)(K2) + (f3)(T)], \text{ wherein,}$$

K2 refers to the latency indicator;
S refers to the start symbol of the slot transmit boundary;
T refers to the PUSCH slot transmission time duration;
P refers to the received power;
C refers to the SCS;
G refers to the grant size;
I refers to the interference level; and
M refers to the spectral efficiency.

6. The method of claim 5, wherein the latency indicator K2 is a slot offset value, and wherein the slot offset value is greater than or equal to 1.

7. The method of claim 4, wherein the scoring function includes the following equation:

Grant_Score=$[(f4)(P)+(f5)(C)-(f6)(G)-(f7)(I)-(f8)(M)]/[(f1)(K2)+(f2)(S)+(f3)(T)]$, wherein, K2 refers to the latency indicator;
S refers to the start symbol of the slot transmit boundary;
T refers to the PUSCH slot transmission time duration;
P refers to the received power;
C refers to the SCS;
G refers to the grant size;
I refers to the interference level; and
M refers to the spectral efficiency.

8. The method of claim 7, wherein the latency indicator K2 is a slot offset value, and wherein the slot offset value is less than 1.

9. A method for managing a scheduling service, the method comprising:
   determining a score for each of multiple service grants from multiple cells based on a scoring function, wherein the scoring function includes one or more radio channel conditions associated with the multiple service grants; wherein the one or more radio channel conditions of the scoring function includes one or more of:
   a latency indicator (K2);
   a start symbol(S) of a slot transmit boundary;
   a Physical Uplink Shared Channel (PUSCH) slot transmission time duration (T);
   a received power (P);
   a SubCarrier Spacing (SCS);
   a grant size (G);
   an interference level (I); or
   a spectral efficiency (M);
   determining a low priority service grant and a high priority service grant of the multiple service grants based on the determined scores; and
   transmitting packets of a low priority service grant once every two packets of the high priority service grant.

10. The method of claim 9, wherein the scheduling service is an uplink medium access control (MAC) grant scheduling service.

11. The method of claim 9, wherein the scoring function includes the following equation:

Grant_Score=Function$(K2,S,T,P,C,G,I,M)$, wherein,

K2 refers to the latency indicator;
S refers to the start symbol of the slot transmit boundary;
T refers to the PUSCH slot transmission time duration;
P refers to the received power;
C refers to the SCS;
G refers to the grant size;
I refers to the interference level; and
M refers to the spectral efficiency.

12. The method of claim 9, wherein each of the one or more radio channel conditions of the scoring function has a weighting factor (f).

13. The method of claim 12, wherein the scoring function includes the following equation:

Grant_Score=$[(f4)(P)+(f5)(C)-(f2)(S)-(f6)(G)-(f7)(I)-(f8)(M)]/[(f1)(K2)+(f3)(T)]$, wherein, K2 refers to the latency indicator;
S refers to the start symbol of the slot transmit boundary;
T refers to the PUSCH slot transmission time duration;
P refers to the received power;
C refers to the SCS;
G refers to the grant size;
I refers to the interference level; and
M refers to the spectral efficiency.

14. The method of claim 13, wherein the latency indicator K2 is a slot offset value, and wherein the slot offset value is greater than or equal to 1.

15. The method of claim 12, wherein the scoring function includes the following equation:

Grant_Score=$[(f4)(P)+(f5)(C)-(f6)(G)-(f7)(I)-(f8)(M)]/[(f1)(K2)+(f2)(S)+(f3)(T)]$, wherein, K2 refers to the latency indicator;
S refers to the start symbol of the slot transmit boundary;
T refers to the PUSCH slot transmission time duration;
P refers to the received power;
C refers to the SCS;
G refers to the grant size;
I refers to the interference level; and
M refers to the spectral efficiency.

16. The method of claim 15, wherein the latency indicator K2 is a slot offset value, and wherein the slot offset value is less than 1.

17. A non-transitory computer-readable storage medium having instructions stored thereon that, when executed by one or more processors, cause the one or more processors to implement the instructions so as to perform a method, the method comprising:
   determining a score for each of multiple service grants from multiple cells based on a scoring function, wherein the scoring function includes one or more radio channel conditions associated with the multiple service grants; wherein the one or more radio channel conditions of the scoring function includes one or more of:
   a latency indicator (K2);
   a start symbol(S) of a slot transmit boundary;
   a Physical Uplink Shared Channel (PUSCH) slot transmission time duration (T);
   a received power (P);
   a SubCarrier Spacing (SCS);
   a grant size (G);
   an interference level (I); or
   a spectral efficiency (M);
   prioritizing the multiple service grants based on the determined scores; and
   assigning scheduling opportunities to the multiple service grants based on the determined scores of the multiple services grants in a geometric decreasing manner,
   wherein, in the geometric decreasing manner, packets of a low priority service grant of the multiple service grants are transmitted intermittently between packets of a high priority service grant of the multiple service grants.

18. The non-transitory computer-readable storage medium of claim 17, wherein the packets of the low priority service grant are transmitted once every two packets of the high priority service grant of the multiple service grants.

* * * * *